(No Model.)

J. A. LAPEYRE.
RACING BOOK, SHEET, OR CARD.

No. 497,189. Patented May 9, 1893.

*Fig. 1.*

REMARKS. { Pedigree. } Age. Name of horse. Weight carried.
Name of owner. Jockey's color and number.

*Fig. 2.*

REMARKS. { Spendthr. / Imp. Torchl. } 6 yrs. LAMPLIGH. 110 lbs.
John Doe. Blue, white sleeves, red cap. No. 10.

[1] Started very badly.
[2] Was interfered with.
[3] Fell.

| F. | G. | f. | G.¹ | Hy.² | V.H. | Slo. | Sly. | F. | Hrd. | My.³ | S.M. | F.R. |
|---|---|---|---|---|---|---|---|---|---|---|---|---|
| 3 | 3² | ½ | 4² | 5 | 1⅛ | 6 | 6² | 7 | 7² | 1¼ | 1½ | 2 |
| 37² | 42² | 51² | 59³ | 1.05 | 2.04² | 1.18 | 1.24³ | 1.28 | 1.38 | 2.12 | 2.45 | 3.15² |
| 105 | 110 | 108 | 112 | 115 | 95 | 110 | 100 | 95 | 95 | 98 | 90 | 105 |
| 1¹ᐟ² G. | 2² | 3²ᐟ² | 4⁴ | 6⁵ | 2ᴴ | 2ᴴ | 1 r/w | 3¹ᐟ² | 1¹ᐟ² c | 8/8 | 6/6 | 2⁶ |
| Laml. | Overt. | Overt. | Doggt. | Laml. | Penn. | Tarra. | Garris. | Garris. | Tarra. | Willa. | Hoppe. | Overt. |
| 60 | 70 | 80 | 90 | 95 | 145 | 105 | 110 | 120 | 125 | 150 | 155 | 160 |
| N.O. | Me. | Nash. | Lou. | St L | Glo. | Haw. | Lat. | Mor. | M.M. | Sar. | Was. | S.Fr. |
| 8/5 | 6/1 | 7/1 | 5/2 | 3/1 | 7/10 | 2/1 | 6/5 | 7/5 | 15/1 | 8/1 | 10/1 | 15/1 |
| Sell. | H. | Hcp. | S. | H. | H. | H. | Stake | H. | S. | Stake | Sell. | S. |

Witnesses
Percy C. Bowen
John C. Wilson

Inventor
Joseph A. Lapeyre,
By Whitman & Wilkinson,
Attorneys.

UNITED STATES PATENT OFFICE.

JOSEPH A. LAPEYRE, OF NEW ORLEANS, LOUISIANA.

RACING BOOK, SHEET, OR CARD.

SPECIFICATION forming part of Letters Patent No. 497,189, dated May 9, 1893.

Application filed December 3, 1892. Serial No. 453,924. (No specimens.)

*To all whom it may concern:*

Be it known that I, JOSEPH A. LAPEYRE, a citizen of the United States, residing at New Orleans, in the parish of Orleans and State of Louisiana, have invented certain new and useful Improvements in Racing Books, Sheets, or Cards; and I do hereby declare the following to be a full, clear, and exact description of the invention, such as will enable others skilled in the art to which it appertains to make and use the same.

My invention relates to means for keeping track of the history of each individual horse that appears at a given race meeting, and it is intended to give the history of the horse and his achievements in a compact and yet complete form, so that such information may be speedily acquired.

My invention will be better understood after reference to the accompanying drawings, wherein—

Figure 1 represents a view of my table or chart before being filled in with a description of the horse and the various races in which he has participated. Fig. 2 represents the chart as filled out with the history of a fictitious race.

Referring to Fig. 1, the sheet or rectangular portion of a sheet of paper, is provided, preferably at the lower right hand portion, with a rectangle ruled with horizontal lines spaced approximately as shown, and with equidistant vertical lines, each pair of vertical lines including the data of any one race, and each pair of horizontal lines including the terms or abbreviations indicative of 1, the condition of the track; 2, the length of the race; 3, the time made by the horse that won the race; 4, the weight carried by the horse in the race; 5, the place of the horse at finish; 6, the name of the jockey; 7, the number of race in the index, or date of race; 8, the name of track; 9, odds laid by bookmakers, and 10, the kind of race. The number of these horizontal lines, and the consequent headings may be increased or diminished at will, but I prefer that there should be ten such headings, as herein described. At the top of the page I place the pedigree, the age, and the name of the horse, the weight to be carried by the horse, the name of the owner, and the jockey's color and number, when obtainable.

In the vertical column at the left hand side of the page or sheet, I provide a column headed "Remarks," to be used for any notes or other unusual data incident to any one or more of the races referred to. Fig. 2 represents a specimen page or sheet as filled out. Thus the sire and dam of the horse "Lampligh." being "Spendthr." and "Torchl.," the age of the horse being six years, the weight to be carried in the next race being one hundred and ten pounds, the owner, John Doe, the colors of the jockey being blue with white sleeves and a red cap, and the number of the jockey being 10, the other particulars of the various races are given in the various vertical columns corresponding to the items indicated in Fig. 1. Thus the first column represents the first race in which the track was fast indicated by "F," the length of the race was three furlongs, the time of the race was thirty-seven and one-half seconds, the weight carried was one hundred and five pounds, the place of the horse was 1, by one and a half lengths, and galloping at the finish, indicated by G; the name of the jockey was Laml., the number of the race in the index, which should preferably accompany the book was 60, the race was run at New Orleans, indicated by "N. O.," the odds on the race were eight to five, and the race was a selling race indicated by "Sell." This completes the description of that one race. Now, skipping to the fourth race, we find that the track was good, but the numeral 1 shows under the head of remarks, that the horse started very badly.

In the fifth race we see that the track was heavy, and note in the remarks that the horse was interfered with.

In the eleventh race we note that the track was muddy, and that the horse fell during the race.

Referring to the fifth line indicating the place of the horse at the finish, we find that in the seventh race Lampligh. was second by a head, and that in the eighth he was first by a nose, the jockey whipping him. Any prearranged system of abbreviations may be appended to the book or sheet, and serve as the key. It will be seen that one or more vacant columns may be left to fill in during the meet, and that the number of vertical columns representing the races, and of horizontal lines representing the particulars of each race, may be varied at will.

I purpose to use this device either in book form, with portions of one or more pages devoted to the history of each horse, to race at any meeting, together with an index of the horses, races, tracks, &c.; or I may publish the same in sheet form or on a special card; or I may include the same in a newspaper to be published daily during the meeting. By thus having a full record of the horse arranged in compact and convenient form, such data as are generally desired, may be readily and rapidly obtained by those in attendance at the races, or by other persons interested.

Having thus described my invention, what I claim, and desire to secure by Letters Patent of the United States, is—

In a racing book, sheet, or card, a leaf having a space thereon inclosed by a rectangle and an inner rectangular space occupying the lower right hand portion of said inclosing rectangle, there being a margin between the two rectangles above and to the left of the said inclosed rectangle; the margin above the inclosed rectangle containing the words pedigree, age, name of horse, weight carried, name of owner, jockey's color and number; and the margin to the left of the inclosed rectangle being occupied by a column headed "Remarks," and the inclosed rectangle being divided by vertical equidistant lines, and by horizontal lines at varying distances, into a plurality of rectangular spaces of equal widths and varying altitudes, substantially as and for the purposes described.

In testimony whereof I affix my signature in presence of two witnesses.

JOSEPH A. LAPEYRE.

Witnesses:
DAVID C. HOLLANDER,
WM. ARMSTRONG.